US005743405A

United States Patent [19]
Reid

[11] Patent Number: 5,743,405
[45] Date of Patent: Apr. 28, 1998

[54] FOOD STORAGE CONTAINER

[76] Inventor: Brenda C. Reid, 203 Atlanta St., Barnesville, Ga. 30204

[21] Appl. No.: 707,609

[22] Filed: Sep. 5, 1996

Related U.S. Application Data

[63] Continuation-in-part of Ser. No. 565,942, Dec. 1, 1995, abandoned.

[51] Int. Cl.$^6$ ................................................. B65D 30/20
[52] U.S. Cl. ......................... 206/541; 206/216; 206/557; 229/938; 383/4; 383/120; 426/115
[58] Field of Search ........................ 206/215, 541, 206/557, 558; 150/150; 229/938; 383/4, 120; 426/112, 115

[56] References Cited

U.S. PATENT DOCUMENTS

| | | |
|---|---|---|
| 2,333,587 | 11/1943 | Salfsberg . |
| 3,278,109 | 10/1966 | Salway . |
| 3,394,871 | 7/1968 | Williams et al. . |
| 3,446,416 | 5/1969 | Epstein .................................... 206/557 |
| 3,456,866 | 7/1969 | Civitello . |
| 3,456,867 | 7/1969 | Repko . |
| 3,456,868 | 7/1969 | Snabb et al. . |
| 3,750,937 | 8/1973 | Goodwin . |
| 3,851,789 | 12/1974 | Case et al. . |
| 3,937,389 | 2/1976 | Wind ........................................ 206/557 |
| 4,041,851 | 8/1977 | Jentsch . |
| 4,131,195 | 12/1978 | Worrell, Sr. . |
| 4,355,718 | 10/1982 | Hagelberg . |
| 4,498,591 | 2/1985 | Smith, II . |
| 4,696,404 | 9/1987 | Corella . |
| 4,718,556 | 1/1988 | Hildebrandt . |
| 4,903,841 | 2/1990 | Ohsima et al. . |
| 4,930,637 | 6/1990 | DeRoseau . |
| 5,012,971 | 5/1991 | Cozzi et al. ............................ 426/115 |
| 5,058,761 | 10/1991 | Williams . |
| 5,316,386 | 5/1994 | Moore . |
| 5,454,644 | 10/1995 | Augustin .................................. 383/4 |

*Primary Examiner*—Paul T. Sewell
*Assistant Examiner*—Luan K. Bui
*Attorney, Agent, or Firm*—Troutman Sanders LLP; Scott M. Frank

[57] ABSTRACT

An improved food storage container is formed from a container body having two sides separated by a shared edge, which defines an axis about which the two sides are adapted for movement between open and storage positions. The open position is defined by a substantially planar disposition of the two sides, while the closed position is defined by the formation of a substantially air-tight cavity. A seal extends around the three nonshared sides of the periphery of the first and second container sides. The seal is of a type that is readily adapted for repeated use, and forms a substantially air-tight seal when closed. Finally, a pair of symmetrically-disposed service flaps are provided and adapted for movement between active and stowed positions. In use, the service flaps are responsively attached to the two sides to fold out into the active position when the two container sides are motivated to the open position, and into the stowed position when the two container sides are motivated to the closed position. Preferably, the service flaps have a substantially planar disposition, with portions that extend beyond the edges of the two sides, when in the active position.

9 Claims, 5 Drawing Sheets

FOOD STORAGE CONTAINER

CROSS REFERENCE TO RELATED APPLICATION

This application is a Continuation-in-Part of Ser. No. 08/565,942 filed Dec. 1, 1995 now abandoned.

BACKGROUND OF THE INVENTION

1. Field of the Invention

The present invention generally relates to food storage containers, and more particularly to a reusable food storage container having a service area providing a plate-like usable eating, or service, area.

2. Discussion of the Related Art

Flexible plastic sandwich bags have long been known for providing temporary storage containers for perishable food items. Resealable plastic bags, such as the well known Zip-Lock bag is an example of one such storage container that provides a reusable storage container. Initially designed and marketed as a sandwich bag, these containers have since gained widespread popularity for much broader, perishable food storage container applications.

As an example of a resealable plastic bag, U.S. Pat. No. 4,903,841 discloses a relatively simple, laminate-sheet pouch with superimposed tear lines. A more sophisticated device is taught in U.S. Pat. No. 4,930,637, which discloses a combination food container and eating utensil. This patent discloses a relatively shallow container for storing a food item, and is specially adapted with circular projections that engage corresponding apertures in eating utensils. In this way, the container may store both food items as well as eating utensils.

U.S. Pat. No. 5,058,761 discloses a reclosable food storage container having a semi-rigid base including a recess for containing the food. A flexible, thin film lid overlies the recessed base, and is reclosably secured thereto on three sides by a ribbed seal.

Notwithstanding the broad present application of the wide variety of prior art storage containers, including those described above, none of the foregoing devices, nor any others known by Applicant, are readily adapted to provide any kind of service area, much like a plate or tray, for eating.

SUMMARY OF THE INVENTION

Accordingly, a primary object of the present invention is to provide an improved food storage container.

A more specific object of the present invention is to provide a food storage container that is readily adapted to provide a service area for eating.

Another object of the present invention is to provide a reusable food storage container that is adapted for repeated use, and is therefor one that is economical in use.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, the present invention is generally directed to an improved food storage container. In accordance with one aspect of the invention, a container body is provided having two sides separated by a shared edge defining an axis about which the two sides are adapted for movement between open and storage positions. The open position is defined by a substantially planar disposition of the two sides, while the closed position is defined by the formation of a substantially air-tight cavity. First and second seal portions are also provided. These seal portions are disposed about the nonshared periphery of the first and second container sides, and are adapted to cooperatively engage to form a substantially airtight resealable seal about the otherwise nonshared periphery of the container. Finally, a pair of symmetrically-disposed service flaps are provided and adapted for movement between active and stowed positions. In use, the service flaps are responsively attached to the two sides to fold out into the active position when the two container sides are motivated to the open position, and into the stowed position when the two container sides are motivated to the closed position. Preferably, the service flaps have a substantially planar disposition, with portions that extend beyond the edges of the two sides, when in the active position.

In accordance with another aspect of the invention, the improved food storage container includes a slide-out platter. Like the first embodiment, this embodiment also includes a container body defining a cavity for storing perishable food items. The container further defines a mouth adapted for movement between open and closed positions. When in the open position, the mouth provides an access passage for inserting and removing the perishable food items from the cavity. A seal is disposed at the mouth for closing the mouth to provide a substantially airtight cavity for the stored food items. A service platter is attached to the container and adapted for movement between service and stowed positions. Finally, retaining means are provided for retaining the service platter in operable connectivity with the container.

DESCRIPTION OF THE DRAWINGS

The accompanying drawings incorporated in and forming a part of the specification, illustrate several aspects of the present invention, and together with the description serve to explain the principles of the invention. In the drawings.

Figure 1:
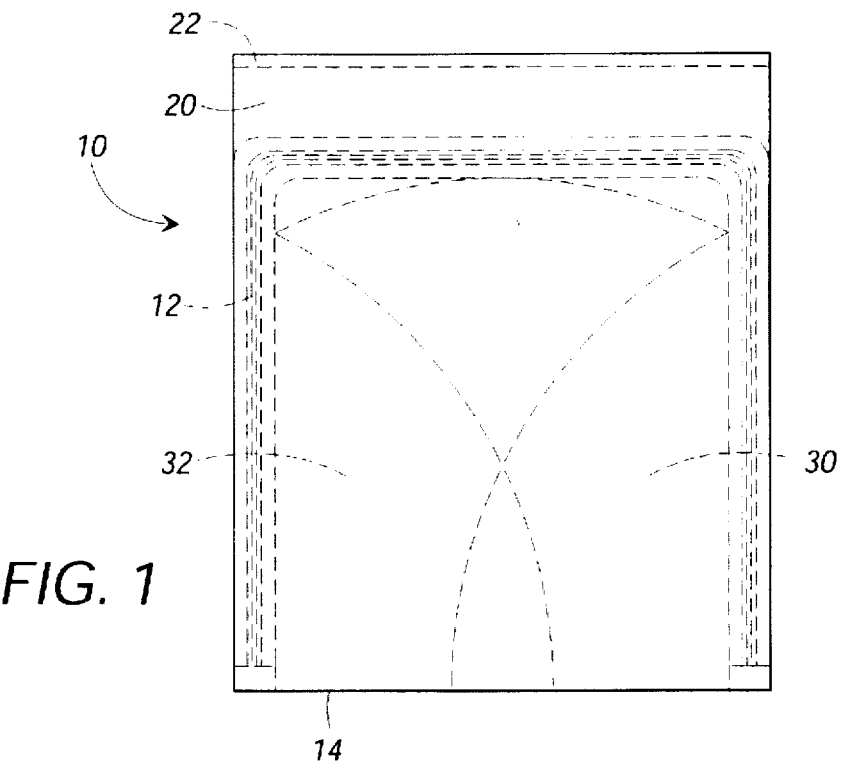
FIG. 1 is a side view illustrating a food storage container constructed in accordance with a preferred embodiment of the invention.

Reference will now be made in detail to the description of the invention as illustrated in the drawings. While the invention will be described in connection with these drawings, there is no intent to limit it to the embodiment or embodiments disclosed therein. On the contrary, the intent is

3 to cover all alternatives, modifications and equivalents included within the spirit and scope of the invention as defined by the appended claims.

DETAILED DESCRIPTION OF THE PREFERRED EMBODIMENT

Figure 2:
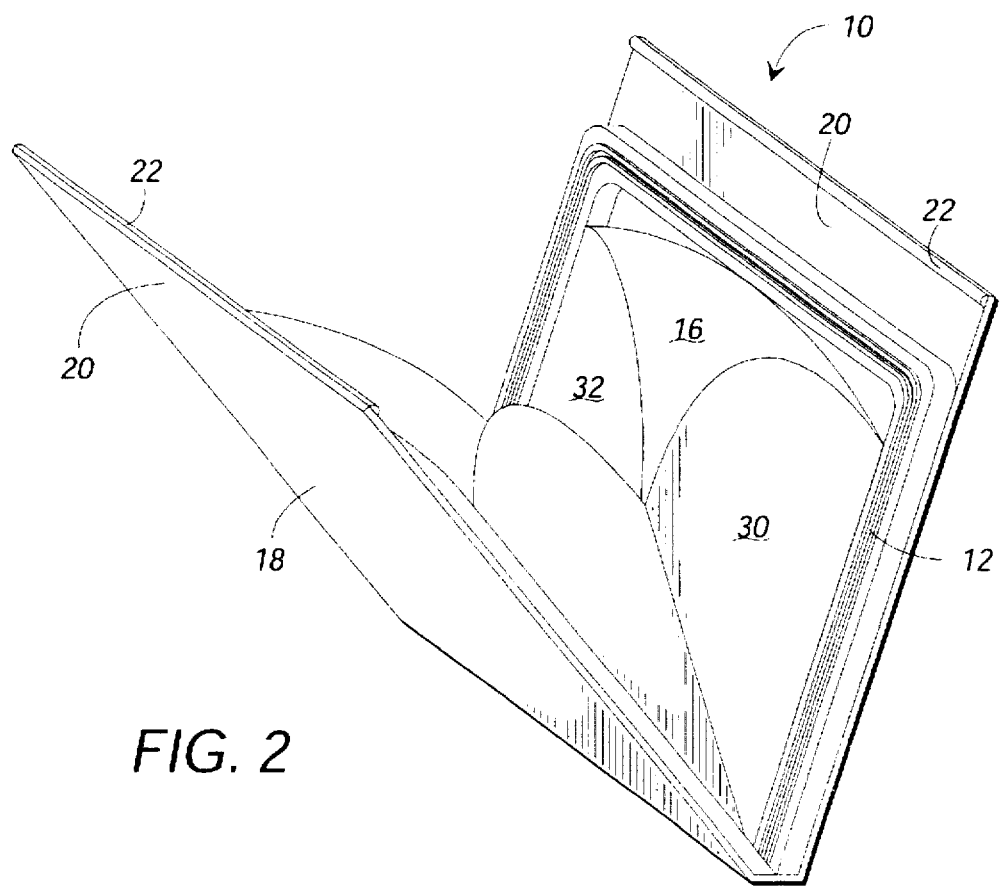
FIG. 2 is a perspective view of the food storage container illustrated in FIG. 1, shown in a partially open position.
Figure 3:
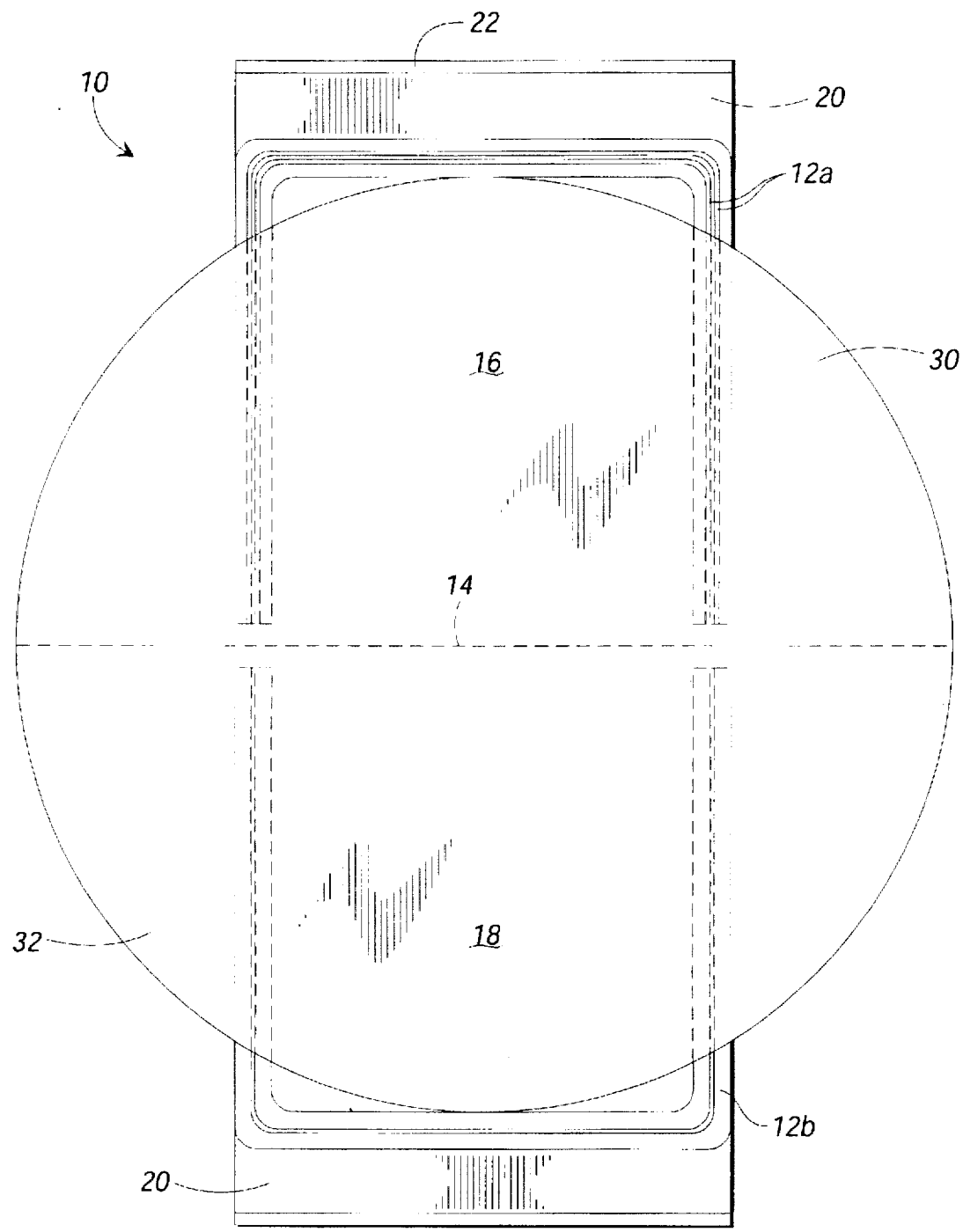
FIG. 3 is a top view depicting an open position of the food storage container of FIG. 1.

Turning now to the drawings, FIGS. 1–3 illustrate a sandwich container constructed in accordance with a preferred embodiment of the present invention, and generally designated by reference numeral 10. In the preferred embodiment, the container 10 is rectangular in shape and is dimensioned to encapsulate a sandwich.

It is a primary object of the present invention to provide a food storage container that also provides a service area that minimizes the mess or debris (e.g., bread crumbs) left from eating. To achieve this object, the container 10 is adapted to move between open and storage positions. FIG. 1 illustrates a container 10 in the storage position, while FIGS. 2 and 3 illustrate the container 10 in partially open and open positions, respectively. As illustrated in FIG. 3, when the container 10 is disposed in the open position, it lies substantially flat on an eating surface. To facilitate this disposition, a seal 12 is provided to span three sides of the container 10. The shared side or edge 14, therefore, effectively divides the container 10 into two halves or sides 16, 18.

As is known in the art, the seal 12 may be integrally formed with the container 10 to comprise two halves 12a and 12b that cooperate through a press-fit engagement to form a substantially air-tight seal. In this regard, a first half 12a may include an elongated groove, while the cooperating portion 12b includes a corresponding, elongated ridge that may be pressed to fit snugly within the groove. In like fashion, the container sides 16, 18 may be opened from the storage position by applying an opposing force to separate the seal 12. To this end, a short lip or flange 20 is provided on each container side 16, 18 opposite the shared edge 14 for gripping to open the container 10.

To further facilitate the grip, an elongated bead or ridge 22 may be provided along each flange 20. The seal 12 may be broken and the container 10 opened by gripping the flanges 20 and pulling them apart. Although the container 10 may be slippery if wet, the beads 22 enhance the grip to assist the user in opening the container 10.

It is an important aspect of the present invention to not only provide a container for storing food items, but also to provide an eating area or service area much like a food tray or plate. To this end, a pair of service flaps 30 and 32 are integrally formed with, and symmetrically disposed on, the container 10. As illustrated in FIGS. 1–3, when the container 10 is sealed, the service flaps 30 and 32 fold inwardly and are inclosed within the seal. After the seal 12 is broken and in response to the separation of the container sides 16 and 18, the service flaps 30 and 32 fold outwardly (FIG. 2). Once the sides 16 and 18 are completely outstretched, the service flaps 30 and 32 form a substantially planar, circular-shaped service area. This service area may then be used like a food tray or plate to catch debris, such as bread crumbs, as a user eats.

Although the container 10 is preferably fabricated from a flexible polyethylene, it will be appreciated by those skilled in the art that other materials and different degrees of rigidity may be desired. Indeed, it may be desired to fabricate the container 10 from a predominately rigid plastic. Utilizing a material and construction which can withstand repeated dishwasher cycles results in a container 10 that may be reused, thereby greatly enhancing the cost-effectiveness of the container 10.

Figure 4:
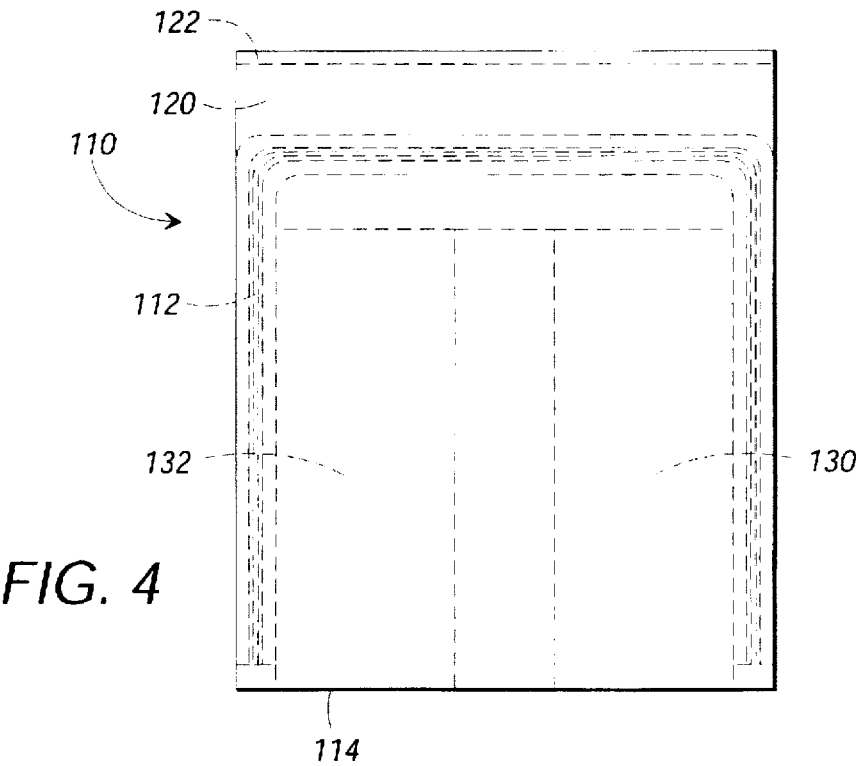
FIG. 4 is a side view illustrating a food storage container constructed in accordance with an alternative embodiment of the invention.
Figure 5:
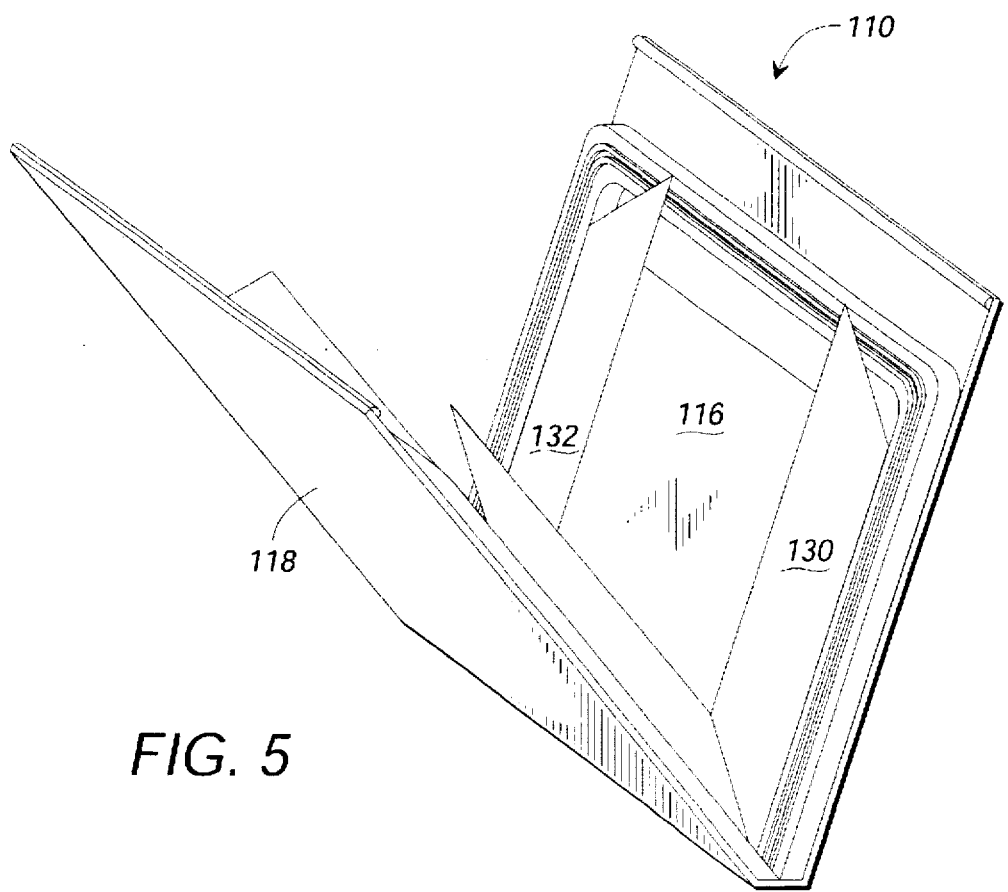
FIG. 5 is a perspective view of the food storage container illustrated in FIG. 4, shown in a partially open position.
Figure 6:
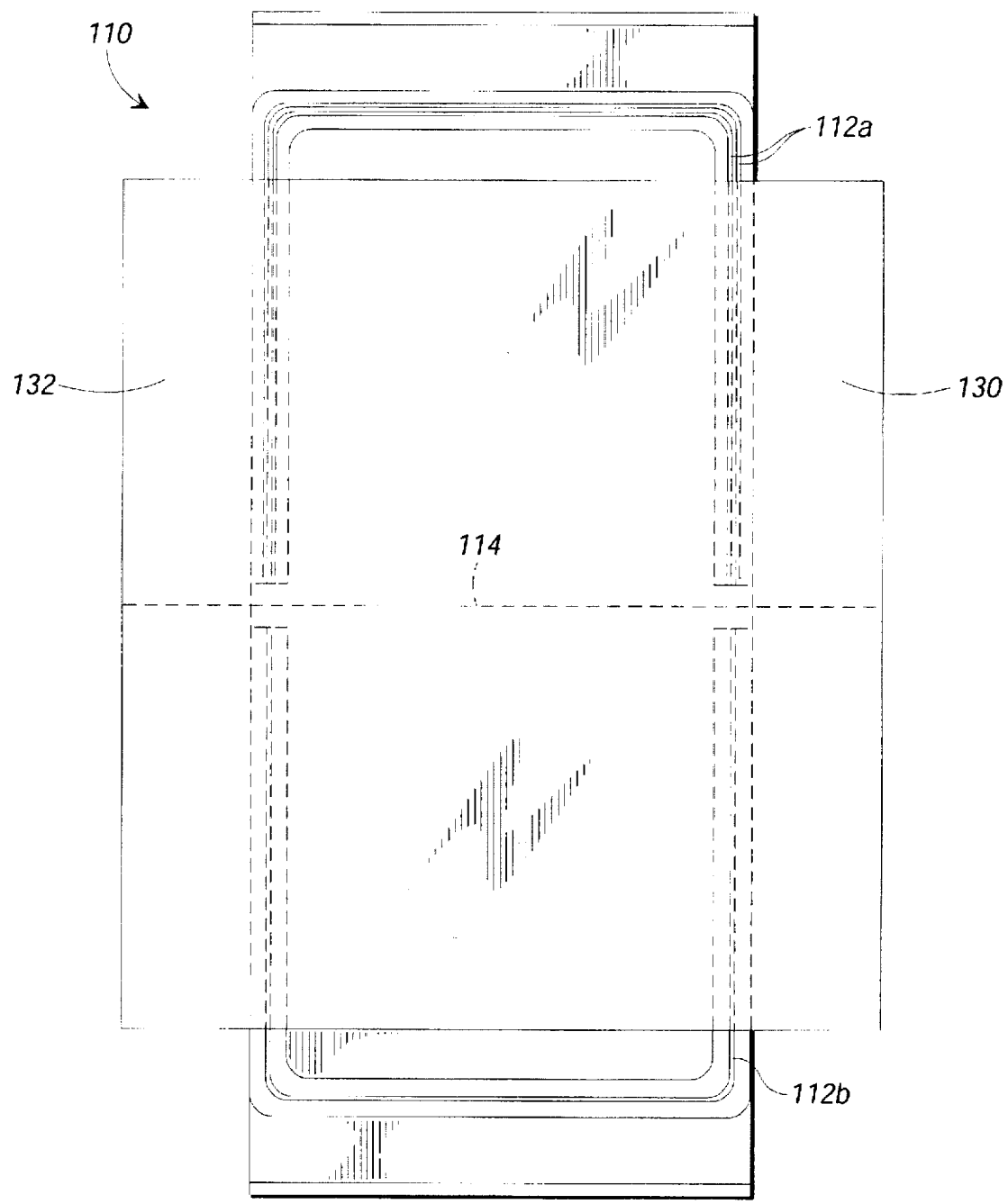
FIG. 6 is a top view depicting an open position of the food storage container of FIG. 4.

FIGS. 4–6 illustrate a similar, but alternative, embodiment. In this embodiment, the service flaps 130 and 132 fold out to form a substantially rectangular-shaped service area, as opposed to a substantially circular-shaped service area formed by the embodiment of FIGS. 1–3. Otherwise, the structure and operation of the two embodiments are the same.

Figure 7A:
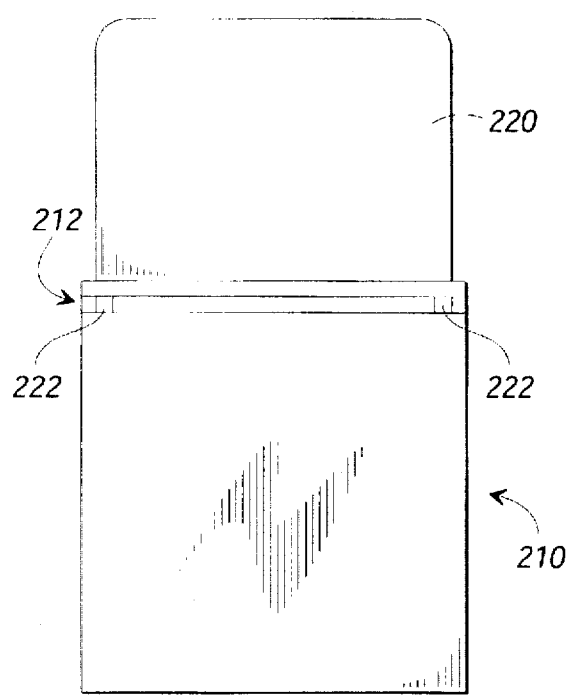
FIG. 7A–7C are side views of a alternative embodiments of a food storage container constructed in accordance with the invention.
Figure 7B:
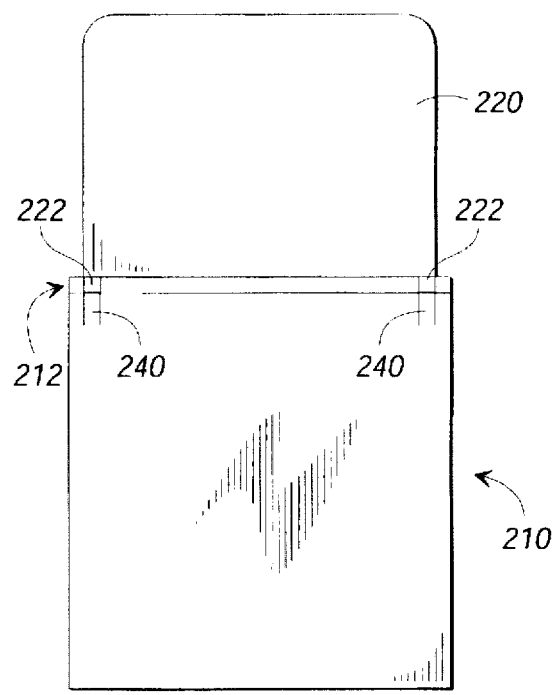
Figure 7C:
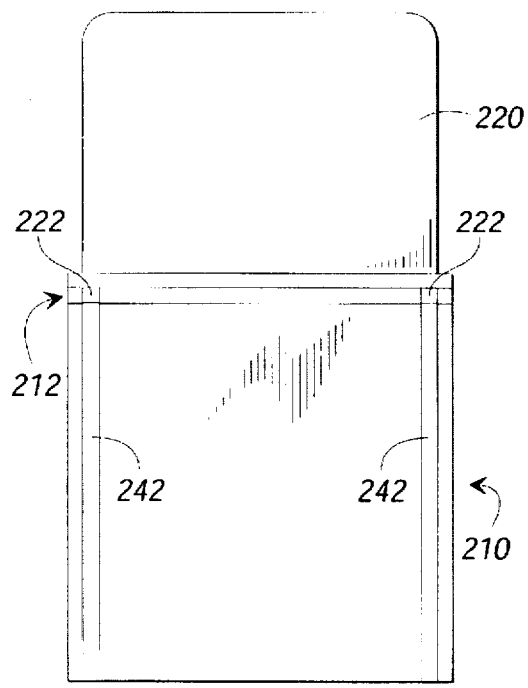

Reference is now made to FIGS. 7A–7C, which depict variants of a further embodiment of the present invention. In this embodiment, a slide-out platter 220 is coupled with the food storage container 210. Like the service flaps of the other embodiments, the slide-out platter 220 provides a service area for eating. Unlike the containers of FIGS. 1–6, which had a three-sided seal, the container of FIGS. 7A–7C preferably has a seal 212 that extends along one side of the container 210. Closure of the seal 212 seals the mouth of the container 210, providing a substantially air-tight chamber for food storage.

Preferably, the container 210 is fabricated from a relatively flexible material, and the slide-out platter 220 is fabricated from a more rigid material. A means 222 is provided to catch and retain the slide-out platter 220 at the mouth of the container 210. Although not shown in the drawings, this means may comprise a pair of protruding tabs disposed near the edge of the slide-out platter 220 that engage tapered receiving slots formed on the container 210. In use, a tab receiving end of the tapered slots may be wider than the diameter the tabs to readily receive the tabs. A retaining end of the tapered slots, however, may be smaller than than the tabs, so that as the tabs are wedged into the tapered receiving slots to steadfastly hold the slide-out platter 220 in the extended position shown in FIG. 7A.

FIGS. 7B and 7C depict variants to the embodiment of FIG. 7A. In this regard, these variants include extensions 240 and 242 to the tapered slot, which serve to guide the slide-out platter 220 from the container 210. FIG. 7B illustrates a variant that has a relatively short extension 240, while the variant of FIG. 7C has a slotted extension 242 that extends the entire length of the container 210. It will be appreciated that the protruding tab (discussed above) on the slide-out platter 220 is captured within the slotted extensions 240 and 242 to guide the platter 220 into and out of the container 210.

Figure 8:
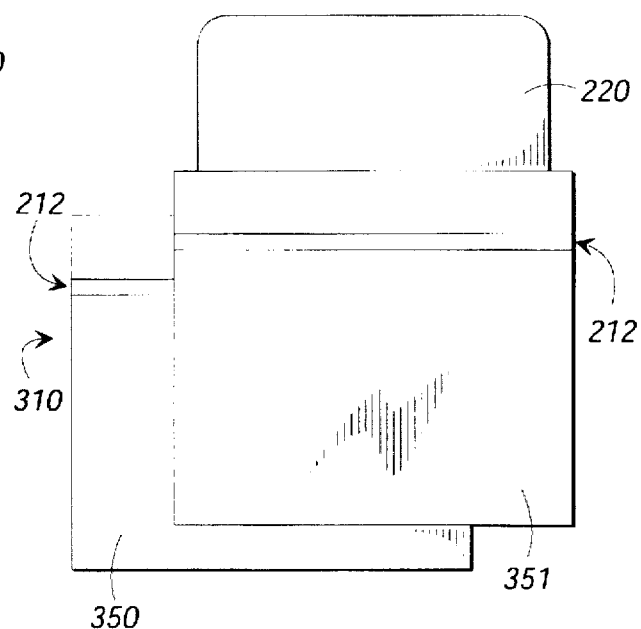
FIG. 8 is a side view of yet a further embodiment of a food storage container constructed in accordance with the present invention.

Finally, FIG. 8 illustrates yet another embodiment of a food storage container 310 constructed in accordance with the present invention. This embodiment is similar to the embodiment of FIG. 7A, except that it comprises two chambers instead of a single food storage chamber. The container 210 of FIG. 7A comprises a single chamber which is used to store both the slide-out platter 220 and the stowed food items. The container 310 of FIG. 8, in contrast, comprises a double chamber. A first chamber 350 stows food items, and a second chamber 351 is used to stow the slide-out platter 220, when it is not in use. Although FIG. 8 is distorted to emphasize the separation of the first and second chambers 350 and 351, it should be appreciated that the two chambers are juxtaposed and, indeed, share a common wall of the container 310. Seals and retaining means, like those discussed in connection with FIGS. 7A–7C are also provided in connection with the container 310.

The foregoing description has been presented for purposes of illustration and description. It is not intended to be exhaustive or to limit the invention to the precise forms disclosed. Obvious modifications or variations are possible in light of the above teachings. The embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

I claim:

1. A food storage container comprising:

a container body including two sides separated by a shared edge defining an axis about which said two sides are adapted for movement between open and storage positions, the open position being defined by a substantially planar disposition of said two sides;

first and second seal portions disposed about the non-shared periphery of the first container side and said second seal portion is disposed about the nonshared periphery of the second container side, wherein said first and second seal portions are cooperatively disposed to form a substantially airtight resealable seal about the otherwise nonshared periphery of the container; and a pair of symmetrically-disposed service flaps adapted for movement between active and stowed positions, wherein said service flaps are responsively attached to said two sides to fold out into the active position when said two sides are motivated to the open position and into the stowed position when said two sides are motivated to the closed position, and wherein said service flaps include a substantially planar disposition with portions that extend beyond the edges of the two sides when in the active position.

2. The food storage container of claim 1, wherein said two sides are substantially rectangular-shaped and dimensioned to form a cavity sized to store a sandwich when disposed in the storage position.

3. The food storage container of claim 1, wherein said first and second seal portions extend along the three non-shared sides.

4. The food storage container of claim 3, wherein said first and second seal portions extend partially along the shared side.

5. The food storage container of claim 1, wherein said container is fabricated from polyethylene.

6. The food storage container of claim 1, wherein said service flaps fold out in response to movement of said two sides to the open position and are shaped to form a substantially circular service area.

7. The food storage container of claim 1, wherein said service flaps fold out in response to movement of said two sides to the open position and are shaped to form a substantially rectangular service area.

8. The food storage container of claim 1, wherein said container is fabricated from a substantially flexible material.

9. The food storage container of claim 1, wherein said container is fabricated from a predominately rigid material.

* * * * *